(12) United States Patent
Al-Atat et al.

(10) Patent No.: US 9,488,193 B2
(45) Date of Patent: Nov. 8, 2016

(54) UNINTERRUPTIBLE POWER SUPPLY SYSTEMS USING ELECTROHYDRAULIC ENERGY STORAGE

(71) Applicant: Eaton Corporation, Cleveland, OH (US)

(72) Inventors: Hassan Al-Atat, Chaska, MN (US); Vishal Mahulkar, Eden Prairie, MN (US); Chad Larish, Minnetonka, MN (US)

(73) Assignee: Eaton Corporation, Cleveland, OH (US)

( * ) Notice: Subject to any disclaimer, the term of this patent is extended or adjusted under 35 U.S.C. 154(b) by 407 days.

(21) Appl. No.: 14/138,660

(22) Filed: Dec. 23, 2013

(65) Prior Publication Data

US 2015/0176607 A1    Jun. 25, 2015

(51) Int. Cl.
| | |
|---|---|
| *F03B 13/00* | (2006.01) |
| *H02P 9/04* | (2006.01) |
| *F15B 1/02* | (2006.01) |
| *H02J 9/06* | (2006.01) |
| *H02J 9/08* | (2006.01) |
| *H02J 15/00* | (2006.01) |
| *F02B 63/04* | (2006.01) |

(52) U.S. Cl.
CPC ............... *F15B 1/022* (2013.01); *H02J 9/062* (2013.01); *H02J 9/08* (2013.01); *H02J 15/003* (2013.01); *Y02E 60/17* (2013.01)

(58) Field of Classification Search
USPC ............... 290/1 R, 54; 60/413, 652; 307/68
See application file for complete search history.

(56) References Cited

U.S. PATENT DOCUMENTS

| | | | | |
|---|---|---|---|---|
| 3,675,112 A | * | 7/1972 | Smith | H02J 9/08 290/30 A |
| 4,010,378 A | * | 3/1977 | Tharpe | B60H 1/00007 290/2 |
| 4,158,145 A | * | 6/1979 | Kartsounes | F02C 3/28 290/52 |
| 4,206,608 A | * | 6/1980 | Bell | F03D 9/007 290/4 R |
| 4,229,661 A | * | 10/1980 | Mead | F03D 9/028 290/44 |
| 4,281,256 A | * | 7/1981 | Ahrens | F02C 6/16 290/1 R |
| 4,353,214 A | * | 10/1982 | Gardner | F01K 3/00 60/39.52 |
| 4,409,490 A | * | 10/1983 | Caputo | F02B 63/04 290/4 D |

(Continued)

FOREIGN PATENT DOCUMENTS

WO    WO 2012/102654 A1    8/2012

OTHER PUBLICATIONS

International Search Report and Written Opinion Corresponding to International Application No. PCT/US2014/070460; Date of Mailing: Mar. 19, 2015; 12 Pages.

(Continued)

*Primary Examiner* — Pedro J Cuevas
(74) *Attorney, Agent, or Firm* — Myers Bigel & Sibley, P.A.

(57) ABSTRACT

A power supply system includes an inverter configured to be coupled to a load and an energy storage device, such as one or more capacitors, coupled to a DC input of the inverter. The power supply system further includes an electrohydraulic energy storage system configured to be coupled to the load and including a hydraulic accumulator, a generator, and a hydraulic motor mechanically coupling the generator and the hydraulic accumulator, along with a control circuit configured to control the electrohydraulic energy storage system responsive to a state of an AC power source coupled to the load.

23 Claims, 7 Drawing Sheets

(56) References Cited

U.S. PATENT DOCUMENTS

| | | | | |
|---|---|---|---|---|
| 4,525,631 A * | 6/1985 | Allison | F03D 9/001 | 290/4 R |
| 4,674,280 A * | 6/1987 | Stuhr | F16H 61/4096 | 180/165 |
| 4,827,152 A | 5/1989 | Farkas | | |
| 5,373,198 A * | 12/1994 | Lopez Jimenez | H02J 9/08 | 290/4 D |
| 6,311,487 B1 * | 11/2001 | Ferch | B60K 16/00 | 180/305 |
| 6,666,022 B1 * | 12/2003 | Yoshimatsu | B60K 6/46 | 60/413 |
| 6,748,737 B2 * | 6/2004 | Lafferty | F03D 9/02 | 290/44 |
| 6,815,840 B1 * | 11/2004 | Aldendeshe | H02P 9/04 | 290/1 A |
| 7,155,912 B2 * | 1/2007 | Enis | F28D 20/00 | 290/52 |
| 7,555,897 B2 * | 7/2009 | Alekseevich | F03D 9/007 | 290/55 |
| 7,656,055 B2 * | 2/2010 | Torres | F03D 11/02 | 290/44 |
| 7,669,414 B2 * | 3/2010 | Loeffler | B60K 6/12 | 60/414 |
| 7,843,076 B2 * | 11/2010 | Gogoana | F15B 1/024 | 290/1 R |
| 7,898,098 B2 * | 3/2011 | Wang | H02K 53/00 | 290/1 A |
| 8,080,888 B1 * | 12/2011 | Daley | B60K 25/02 | 290/43 |
| 8,358,019 B2 * | 1/2013 | Lemus | F04B 35/04 | 290/1 A |
| 8,659,177 B2 * | 2/2014 | Fujishima | E02F 9/2217 | 290/1 R |
| 2002/0060500 A1 * | 5/2002 | Lafferty | F03D 9/02 | 310/11 |
| 2002/0144504 A1 * | 10/2002 | Merswolke | F03D 9/001 | 60/398 |
| 2005/0188689 A1 | 9/2005 | Juby et al. | | |
| 2008/0083222 A1 * | 4/2008 | Hubert | B60K 6/46 | 60/698 |
| 2008/0224477 A1 * | 9/2008 | Kenney | F01D 17/26 | 290/1 R |
| 2009/0139788 A1 * | 6/2009 | Miller | B60K 6/12 | 180/165 |
| 2009/0165450 A1 * | 7/2009 | Cherney | E02F 9/2203 | 60/413 |
| 2009/0179433 A1 * | 7/2009 | Kenney | F01D 17/26 | 290/1 R |
| 2009/0230688 A1 * | 9/2009 | Torres | F03D 11/02 | 290/55 |
| 2009/0273190 A1 * | 11/2009 | Wang | H02K 53/00 | 290/1 R |
| 2010/0107624 A1 * | 5/2010 | Loeffler | B60K 6/12 | 60/415 |
| 2011/0084498 A1 * | 4/2011 | Lemus | F04B 35/04 | 290/1 R |
| 2011/0308382 A1 * | 12/2011 | Huff | B60K 6/12 | 91/459 |
| 2012/0068541 A1 | 3/2012 | Anderson | | |
| 2013/0125540 A1 * | 5/2013 | Vainonen | F15B 15/00 | 60/413 |
| 2013/0300128 A1 * | 11/2013 | Fujishima | E02F 9/2217 | 290/1 R |
| 2014/0166114 A1 * | 6/2014 | Wang | F15B 21/14 | 137/12 |
| 2014/0203567 A1 * | 7/2014 | Lemus | H02K 7/1807 | 290/1 A |
| 2014/0260232 A1 * | 9/2014 | Danzl | E02F 9/2217 | 60/413 |
| 2015/0180281 A1 * | 6/2015 | Al-Atat | H02J 15/003 | 307/66 |

OTHER PUBLICATIONS

International Preliminary Report on Patentability Corresponding to International Application No. PCT/US2014/070460; Date of Mailing: Jul. 7, 2016; 8 Pages.

* cited by examiner

UNINTERRUPTIBLE POWER SUPPLY SYSTEMS USING ELECTROHYDRAULIC ENERGY STORAGE

BACKGROUND

The inventive subject matter relates to power supply systems and methods and, more particularly, to uninterruptible power supply (UPS) systems and methods.

UPS systems are commonly used in commercial and industrial facilities, such as data centers, telecommunications facilities, factories and hospitals. They are often used to provide reliable, high quality power to critical equipment, such as computer systems.

UPS systems typically include one or more batteries, which are used to provide power to critical equipment when a primary utility power source fails. Batteries generally have high energy density, which can enable them to provide power for extended time periods. However, batteries may be expensive to purchase and maintain. They typically require frequent maintenance, may have a relatively short life and it may be difficult to accurately determine their state of health. Batteries also may need controlled environmental conditions, which may restrict their application.

A large number of data centers and other installations now use local backup generator sets (e.g., diesel-electric generator sets) to provide extended backup power. However, such generator sets typically require significant time to start up and stabilize before their power output is of sufficient quality to serve the load. Because of this delay, such installations still typically use battery-based UPSs to provide backup power after a utility failure until the output of the backup generator set stabilizes.

SUMMARY

Some embodiments of the inventive subject matter provide a power supply system including an inverter configured to be coupled to a load and an energy storage device, such as one or more capacitors, coupled to a DC input of the inverter. The power supply system further includes an electrohydraulic energy storage system configured to be coupled to the load and including a hydraulic accumulator, a generator, and a hydraulic motor mechanically coupling the generator and the hydraulic accumulator. A control circuit is configured to control the electrohydraulic energy storage system responsive to a state of an AC power source coupled to the load.

According to some embodiments, the control circuit may be configured to selectively provide power to the load from the energy storage device and the hydraulic accumulator responsive to the state of the AC power source. For example, the control circuit may be configured to sequentially supply power to the load from the energy storage device and the hydraulic accumulator responsive to a failure of the AC power source.

In some embodiments, the electrohydraulic energy storage system may be coupled to the DC input of the inverter. The power supply system may include a UPS including the inverter, and the electrohydraulic energy storage system may be configured to be coupled to an AC input or a DC input of the UPS.

In further embodiments, the electrohydraulic energy storage system may further include a reversible motor/pump subsystem configured to be powered by the AC power source. The control circuit may be configured to operate the motor/pump subsystem to charge the hydraulic accumulator.

In some embodiments, the generator may include a reversible motor/generator and the hydraulic pump may include a reversible motor/pump. The control circuit may be configured operate the motor/generator and the motor/pump to charge the hydraulic accumulator.

Further embodiments of the inventive subject matter provide as apparatus including a generator configured to be coupled to a power input of an uninterruptible power supply (UPS), a hydraulic motor configured to drive the generator, a hydraulic accumulator, a valve coupling the hydraulic accumulator to the hydraulic motor and a control circuit configured to control the valve. The generator may be configured to be coupled to an AC input or a DC input of the UPS.

The control circuit may be configured to control the valve responsive to a state of the UPS. The control circuit may be configured to control the valve responsive to a state of a power source coupled to the UPS.

In some embodiments, the apparatus may further include a pump configured to charge the hydraulic accumulator. The UPS may be configured to receive power from a power source and the apparatus may further include a motor coupled to the power source and configured to drive the pump.

In further embodiments, the hydraulic motor may include a motor/pump and the generator may include a motor/generator. The control circuit may be configured to operate the motor/pump as a pump and the motor/generator as a motor to charge the accumulator.

Further embodiments of the inventive subject matter provide methods of operating a UPS. The methods include providing energy to the load from an AC power source via the UPS and providing energy to the load from a hydraulic accumulator via the UPS. Providing energy to the load from a hydraulic accumulator via the UPS may include selectively providing energy to the load from an energy storage device and the hydraulic accumulator via the UPS responsive to a state of the AC power source.

DETAILED DESCRIPTION

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Figure 1:
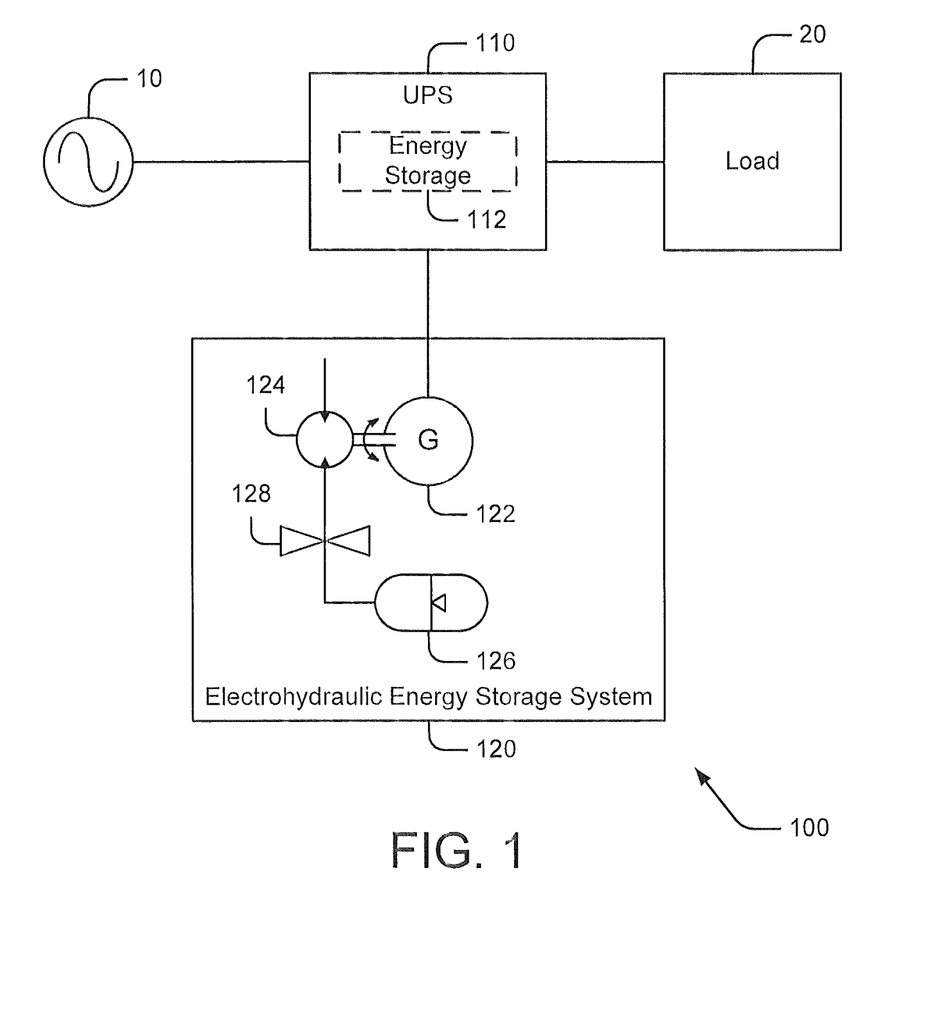
FIG. 1 is a schematic diagram illustrating a power supply system with an electrohydraulic energy storage system according to some embodiments of the inventive subject matter.

FIG. 1 illustrates a power supply system 100 according to some embodiments of the inventive subject matter. The system 100 includes a UPS 110, which is configured to receive power from an AC power source 10 and to supply power to a load 20. The power source 10 may include, for example, one or more utility power sources and/or one or more backup sources (e.g. diesel or gas powered generator set, fuel cell, etc.) for the one or more utility sources. The system further includes an electrohydraulic energy storage system 120, which is configured to provide supplementary energy to the UPS 110. As shown, the electrohydraulic energy storage system 120 includes a hydraulic accumulator 126, which is configured to store energy that is delivered to the UPS 110 via a valve a hydraulic motor 124 and a generator 122 driven by the motor 124. Fluid under pressure may be delivered from the hydraulic accumulator 126 to the motor 124 via a valve 128. The hydraulic accumulator 126 may take any of a variety of different forms, such as compressed gas accumulators employing bladders or pistons.

According to some embodiments, the UPS 110 may be configured to receive energy from the electrohydraulic energy storage system 120 when the power source 10 fails and/or is degraded. The energy stored by the electrohydraulic energy storage system 120 may be sufficient to maintain power at the load 20 until the power source 10 returns to a nominal state, e.g., until utility power returns from a momentary outage and/or is replaced by a backup source, such as a local diesel or gas powered generator set, fuel cell or the like. As further shown in FIG. 1, the UPS 110 may include or be connected to additional energy storage device 112, which may store energy in devices such as batteries, capacitors, supercapacitors and/or ultracapacitors. The energy storage device 112 may be used to bridge between the primary power source 10 and the electrohydraulic energy storage system 120 or otherwise used in conjunction with the hydraulic energy storage system 120.

It will be appreciated that the UPS 110 may take may different forms, including, but not limited to, double-conversion, standby, line interactive, delta conversion and hybrid configurations. The electrohydraulic energy storage system 120 may be interfaced to the UPS 110 in any of a number of different ways, e.g., via an AC input or a DC input. The electrohydraulic energy storage system 120 may be partially or fully integrated with the UPS 110 and/or may be a standalone system that operates in coordination with the UPS 110, with or without control signaling therewith.

Figure 2:
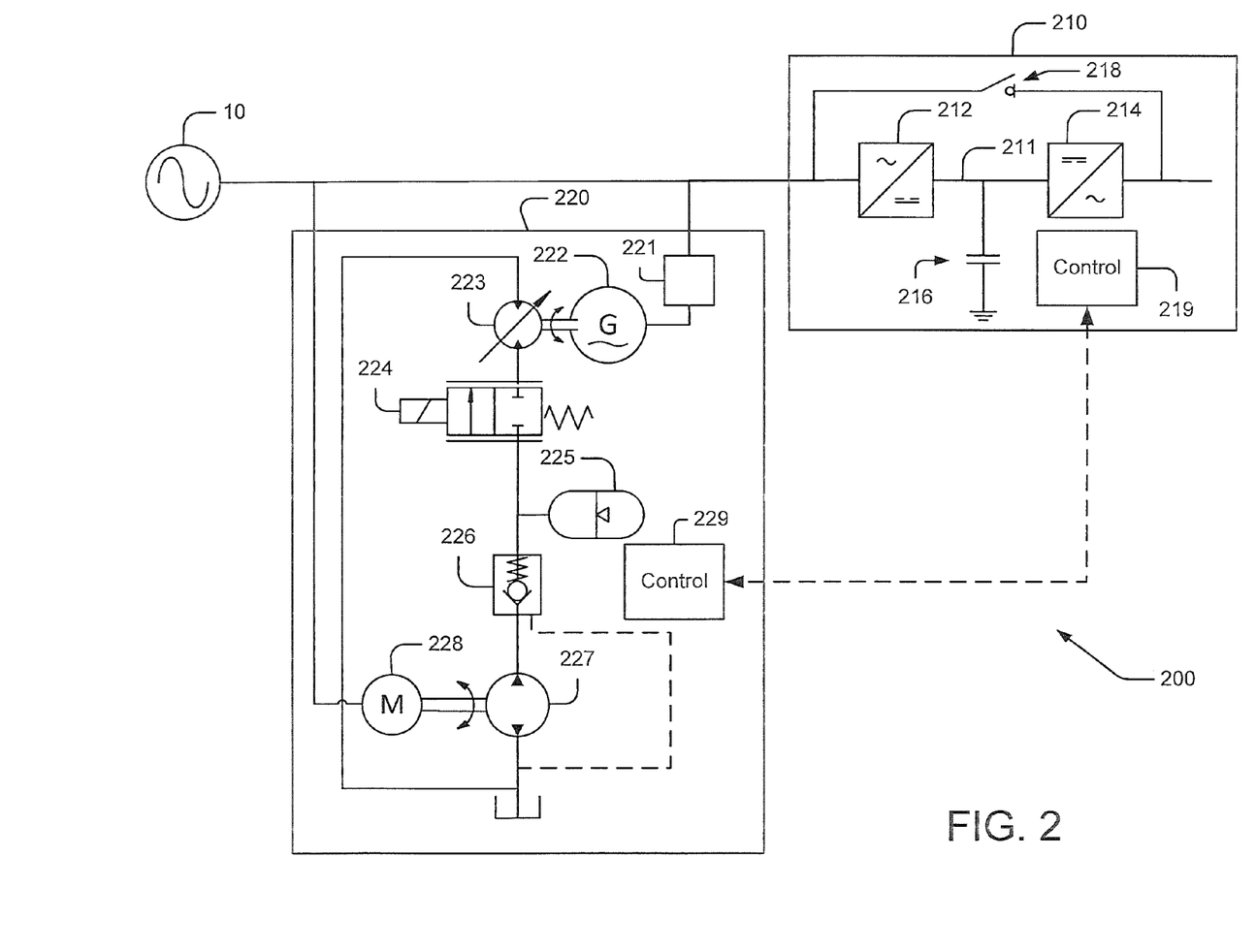
FIG. 2 is a schematic diagram illustrating a power supply system with a electrohydraulic energy storage system interfaced at an AC input of a double conversion UPS p according to some embodiments.

FIG. 2 illustrates a power supply system 200 according to some embodiments. The system 200 includes an online double conversion UPS 210, which is configured to receive power from a primary power source 10. The primary power source 10 may include, for example, a utility source and/or backup generator set, e.g. a generator set configured to substitute for the utility source using an automatic transfer switch or other switchgear. The UPS 210 has a double conversion architecture including a rectifier 212 and an inverter 214 linked by a DC bus 211. An energy storage device, here shown as a capacitor system 216, is coupled to the DC bus 211. The capacitor system 216 may include, for example, electrolytic storage capacitors, supercapacitors and/or ultracapacitors, directly coupled to the DC bus 211 or interfaced thereto using, for example, switching and/or converter circuitry. The UPS 210 may further include a bypass 218, which may be used to bypass the rectifier 212 and the inverter 214 in event of failure thereof, to support maintenance operations on the rectifier 212 and inverter 214 and/or to support certain operational modes, such as high-efficiency modes that directly couple the power source 10 to a load to avoid incurring losses from the rectifier 212 and inverter 214. A control circuit 219 may control the rectifier 212, inverter 214, capacitor system 216, bypass 218 and/or other components of the UPS 210, and may be configured to communicate with other devices and systems.

The system 200 further includes an electrohydraulic energy storage system 220 coupled to an AC input of the UPS 210. The electrohydraulic energy storage system 220 includes an AC generator 222, which may be interfaced to the AC input of the UPS 210 by in interface circuit 221 including switches, converter circuitry and/or other components. The generator 222 is driven by a hydraulic motor 223, which is powered by a hydraulic accumulator 225 via an electrohydraulic valve 224. The accumulator 225 is charged via a non-return valve 226 by a hydraulic pump 227 driven by an electric motor 228. The pump motor 228 may be powered by the AC power source 10 that is coupled to the UPS 210, but it will be appreciated that the motor 228 may be driven by a different power source. The electrohydraulic energy storage system 220 further includes a control circuit 229 configured to control the generator 222, valve 224, motor 228 and/or other components of the electrohydraulic energy storage system 220. The control circuit 229 may also be configured to communicate with the control system 219 of the UPS 210. The electrohydraulic energy storage system 220 may be integrated with the UPS 210 in a common assembly with common control circuitry (e.g., a common control processor) or may be provided as a separate assembly.

In some embodiments, the electrohydraulic energy storage system 220 may be configured to operate responsive to a state of the UPS 210. For example, control signals may pass between the control circuit 219 of the UPS 210 and the control circuit 229 of the electrohydraulic energy storage system 220 to coordinate operations of the UPS 210 and the electrohydraulic energy storage system 220. Such signaling may, for example, support coordinated operation of the UPS 210 and the electrohydraulic energy storage system 220 such that, upon loss of the primary power source 10, the load served by the UPS 210 is first supported by energy stored in the capacitor system 216 until such time as power from the electrohydraulic energy storage system 420 becomes available.

In further embodiments, the hydraulic system 220 may be controlled independently from the UPS 210. For example, the electrohydraulic energy storage system 210 may activate responsive to the state of the primary power source 10. The electrohydraulic energy storage system 220 may spin up upon detecting an outage of the primary power source 10 and may power off upon restoration of the primary power source 10 (e.g., when the utility returns or a backup generator comes on line). The UPS 210 may act to transitionally provide power using energy stored in the capacitor system 216 until power from the electrohydraulic energy storage system 220 becomes available. The nature and capacity of the capacitor system 216 may depend on the speed at which the electrohydraulic energy storage system 220 can produce an acceptable output. For example, in some embodiments, if the response of the electrohydraulic energy storage system 220 is sufficiently rapid, the capacitor system 216 may be limited to simply the type of electrolytic bus capacitors commonly used in UPS systems. If the response is more delayed, higher capacity ultracapacitor/supercapacitor systems may be used. When providing power to the load from the electrohydraulic energy storage system 220, power may be routed through the rectifier 212 and inverter 214 and/or through the bypass 218.

In some embodiments, the UPS 210 and/or the electrohydraulic energy storage system 220 may detect an outage of the primary power source 10, e.g., a failure of a utility power source, and responsively initiate fluid transfer from the accumulator 225 to the hydraulic motor 223, causing power to flow from the electrohydraulic energy storage system 220 to the rectifier 212 of the UPS 210. Until the output of the AC generator 222 is sufficient to maintain the load, the UPS 210 may continue to serve the load using energy stored in the capacitor system 216. Upon detecting return of the primary power source 10, the control circuitry of the UPS 210 and/or the electrohydraulic energy storage system 220 may cease operation of AC generator 222 and operate the motor 228 from the primary power source 10 to recharge the accumulator 225.

Figure 3:
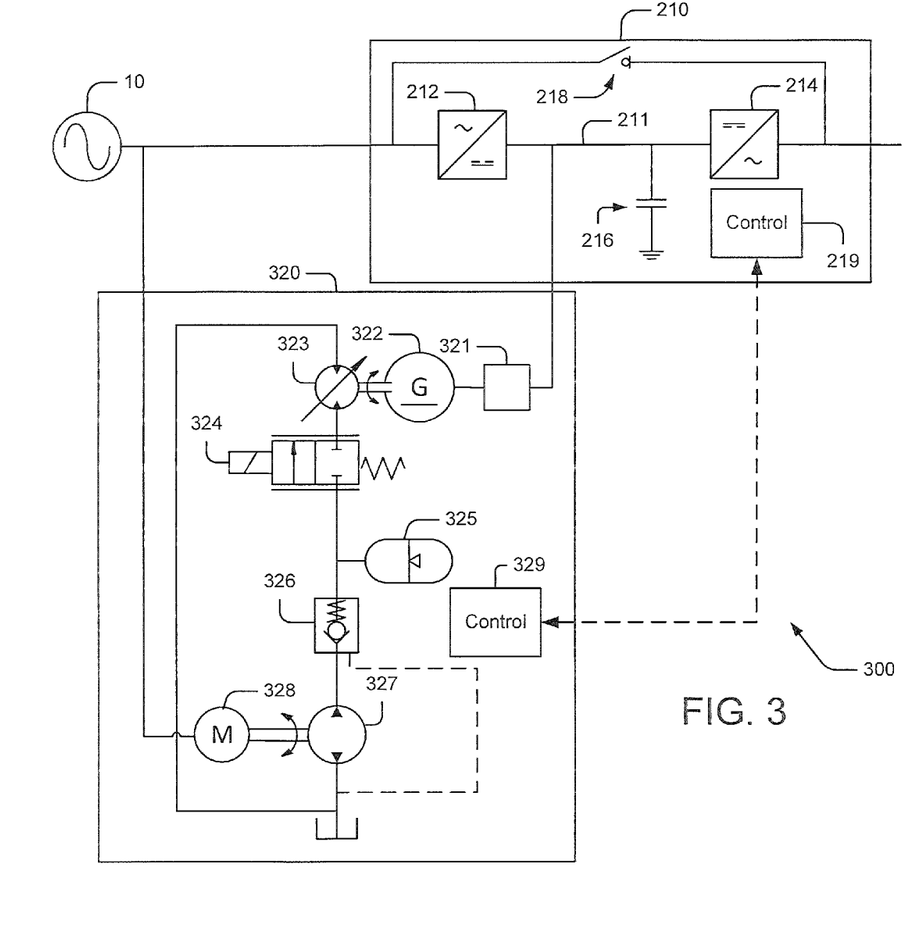
FIG. 3 is a schematic diagram illustrating a power supply system with an electrohydraulic energy storage system interfaced at a DC input of a double conversion UPS according to some embodiments.

According to further embodiments, an electrohydraulic energy storage system may be interfaced to a UPS in other ways. For example, FIG. 3 illustrates a power supply system 300 including an online double conversion UPS 210 which is configured along the lines described above with reference to FIG. 2. The system 300 further includes an electrohydraulic energy storage system 320 interfaced to the DC bus 211 of the UPS 210. The electrohydraulic energy storage system 320 includes a DC generator 322, which may be interfaced to the DC bus 211 of the UPS 210 using an interface circuit 321 that includes switches, converter circuitry and/or other components. The generator 322 is driven by a hydraulic motor 323, which is powered by a hydraulic accumulator 325 via an electrohydraulic valve 324. The accumulator 325 is charged via a non-return valve 326 by a hydraulic pump 327 driven by an electric motor 328. The pump motor 328 may be an AC motor powered by the AC power source 10 that is coupled to the UPS 210, but it will be appreciated that the motor 328 may be driven by a different power source, such as the DC bus 211 of the UPS 210. The electrohydraulic energy storage system 330 further includes a control circuit 329 configured to control the generator 322, valve 334, motor 328 and/or other components of the electrohydraulic energy storage system 320. The electrohydraulic energy storage system 320 may be integrated with the UPS 210 in a common assembly with common control circuitry, or may be provided as a separate assembly.

In some embodiments, the electrohydraulic energy storage system 320 may be configured to operate responsive to a state of the UPS 210. For example, control signals may pass between the control circuit 219 of the UPS 210 and the control circuit 329 of the electrohydraulic energy storage system 320 to coordinate operations of the UPS 210 and the electrohydraulic energy storage system 320. Such signaling may, for example, support coordinated operation of the UPS 210 and the electrohydraulic energy storage system 320 such that, upon loss of the primary power source 10, the load served by the UPS 210 is first supported by energy stored in the capacitor system 216 until such time as power from the electrohydraulic energy storage system 320 becomes available. Power provided by the electrohydraulic energy storage system 320 may be transferred to the load via the inverter 214 of the UPS 210.

According to some embodiments, the UPS 210 and/or the electrohydraulic energy storage system 320 may detect an outage of the primary power source 10 and responsively initiate fluid transfer from the accumulator 325 to the hydraulic motor 323, causing power to flow from the electrohydraulic energy storage system 320 to the DC bus 211 of the UPS 210. Until the output of the DC generator 322 is sufficient to maintain the load, the UPS 210 may continue to serve the load using energy stored in the capacitor system 216. Upon restoration of the primary power source 10, the control circuitry of the UPS 210 and/or the electrohydraulic energy storage system 320 may cease operation of DC generator 322 and operate the motor 328 from the primary power source 10 to recharge the accumulator 325.

Figure 4:
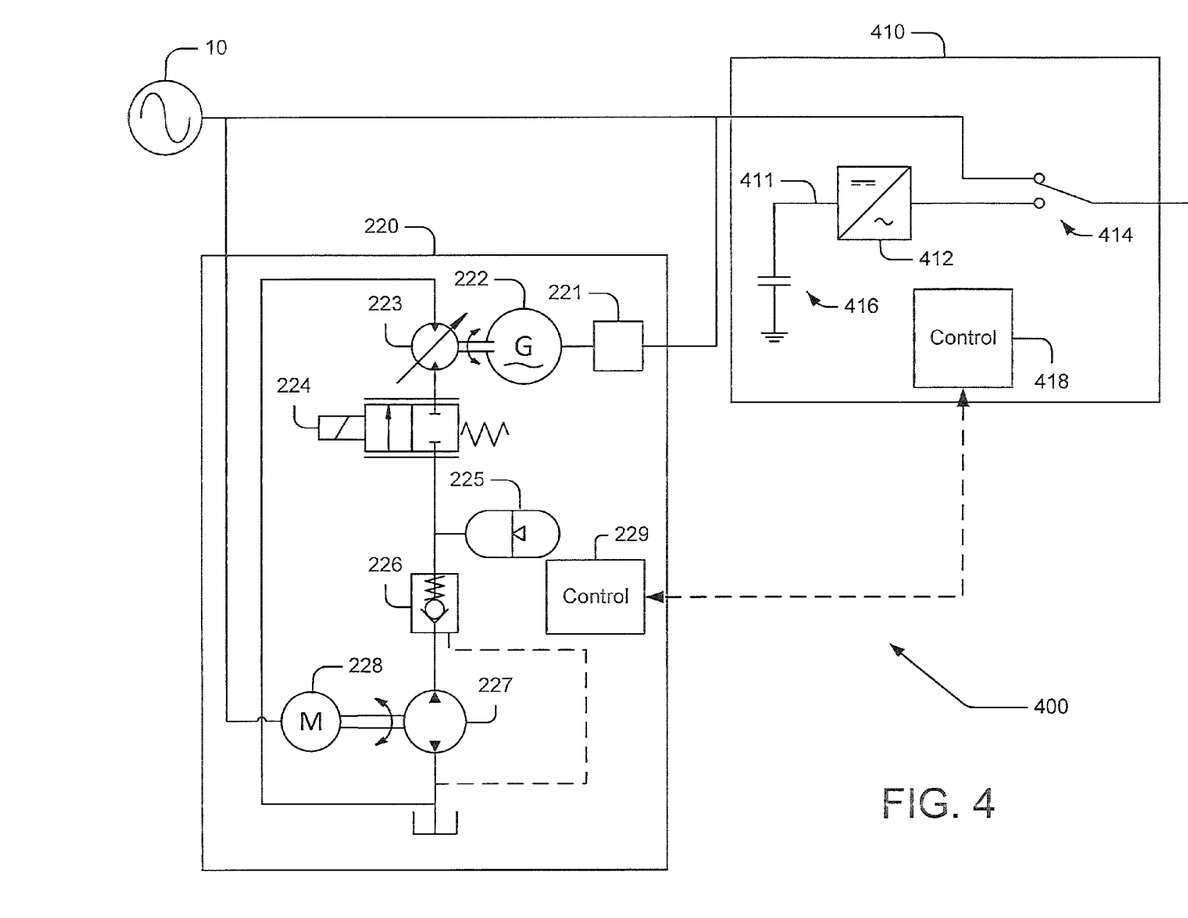
FIG. 4 is a schematic diagram illustrating a power supply system with an electrohydraulic energy storage system interfaced at an AC input of a standby UPS according to some embodiments.

Embodiments of the inventive subject matter may employ other types of UPSs. For example, FIG. 4 illustrates a power supply system 400 that includes a standby UPS 410 configured to receive power from a primary power source 10. The UPS 410 includes an inverter 412 configured to receive power from an energy storage device, here shown as a capacitor system 416, coupled to a DC bus 411. The UPS 410 includes a switch 414 configured to selectively couple the primary power source 10 and an output of the inverter 412 to a load. A control circuit 418 may control operations of the inverter 412, the capacitor system 416 and the switch 414.

The system 400 further includes an electrohydraulic energy storage system 220 along the lines described above with reference to FIG. 2 coupled to an AC input of the UPS 410. The electrohydraulic energy storage system 220 may be configured to operate responsive to a state of the UPS 410.

For example, control signals may pass between the control circuit 418 of the UPS 410 and the control circuit 229 of the electrohydraulic energy storage system 220 to coordinate operations of the UPS 410 and the electrohydraulic energy storage system 220. Such signaling may support coordinated operation of the UPS 410 and the electrohydraulic energy storage system 220 such that, upon loss of the primary power source 10, the load served by the UPS 410 is first supported by energy stored in the capacitor system 416 until such time as power from the electrohydraulic energy storage system 220 becomes available. In further embodiments, the hydraulic system 220 may be controlled independently from the UPS 410. For example, the electrohydraulic energy storage system 220 may activate responsive to the state of the primary power source 10 along lines discussed above with reference to FIG. 2.

The UPS 410 and/or the electrohydraulic energy storage system 220 may detect an outage of the primary power source 10, e.g., a failure of a utility power source, and responsively operate the switch 414 to allow the inverter 412 to power the load from the capacitor system 416. Concurrently, fluid transfer from the accumulator 225 to the hydraulic motor 223 may be initiated. Until the output of the AC generator 222 is sufficient to maintain the load, the UPS 410 may continue to serve the load using energy stored in the capacitor system 416. When the output of the electrohydraulic energy storage system 220 is acceptable, the UPS 410 may operate the switch 414 again to allow the electrohydraulic energy storage system 220 to power the load. Upon detecting return of the primary power source 10, the control circuitry of the UPS 410 and/or the electrohydraulic energy storage system 220 may couple the primary source 10 to the load, cease operation of AC generator 222 and operate the motor 228 from the primary power source 10 to recharge the accumulator 225.

Figure 5:
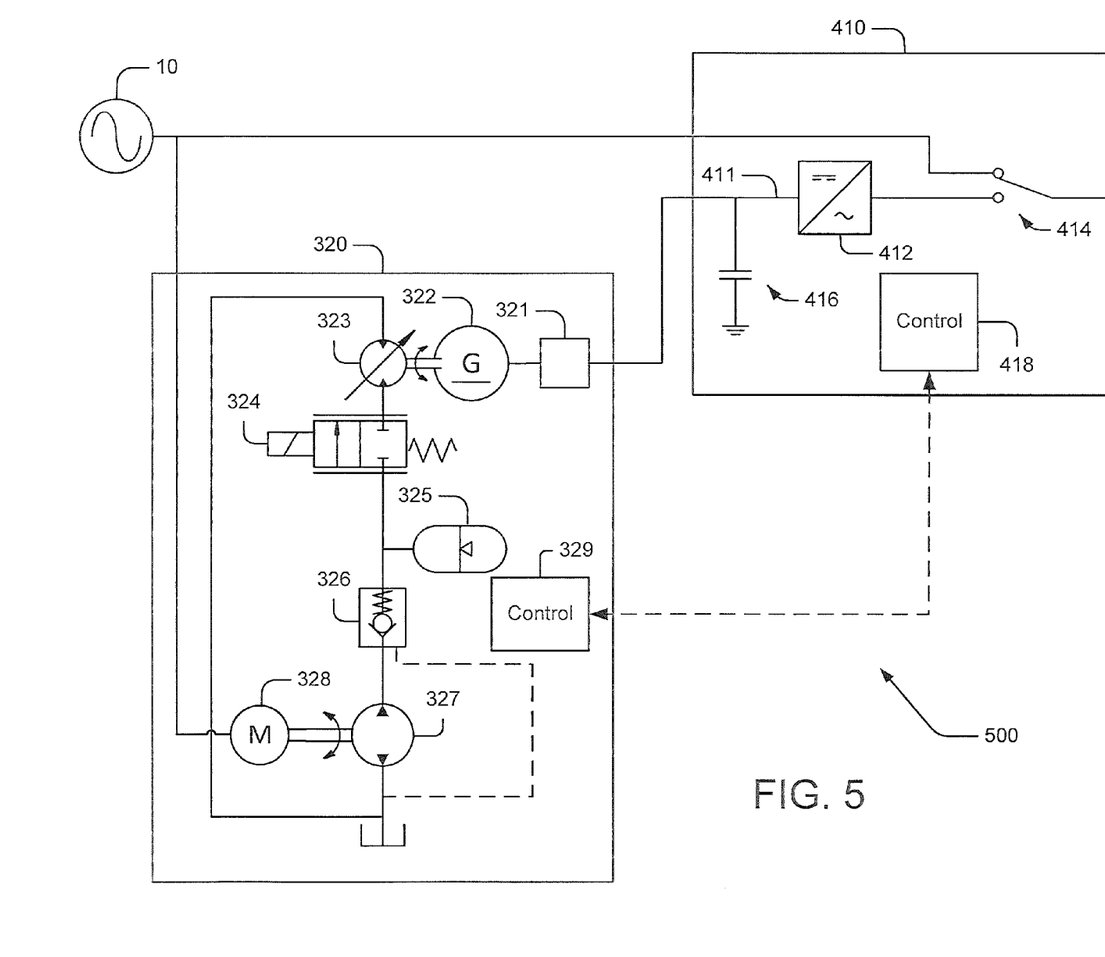
FIG. 5 is a schematic diagram illustrating a power supply system with an electrohydraulic energy storage system interfaced at a DC input of a standby UPS according to some embodiments.

FIG. 5 illustrates a power supply system 500 according to further embodiments. The system 500 includes a standby UPS 410 including components as described above with reference to FIG. 4, along with an electrohydraulic energy storage system 320 along the lines described above with reference to FIG. 3 coupled to the DC bus 411 of the UPS 410. The electrohydraulic energy storage system 320 may be configured to operate responsive to a state of the UPS 410. For example, control signals may pass between the control circuit 418 of the UPS 410 and the control circuit 329 of the electrohydraulic energy storage system 320 to coordinate operations of the UPS 410 and the electrohydraulic energy storage system 320.

The UPS 410 and/or the electrohydraulic energy storage system 320 may detect an outage of the primary power source 10, e.g., a failure of a utility power source, and responsively operate the switch 414 to allow the inverter 412 to power the load from the capacitor system 416, and concurrently initiate fluid transfer from the accumulator 525 to the hydraulic motor 323. Until the output of the DC generator 322 is sufficient to maintain the load, the UPS 410 may continue to serve the load using energy stored in the capacitor system 416. Upon detecting return of the primary power source 10, the control circuitry of the UPS 410 and/or the electrohydraulic energy storage system 320 may cease operation of DC generator 322 and operate the motor 328 to recharge the accumulator 325.

Figure 6:
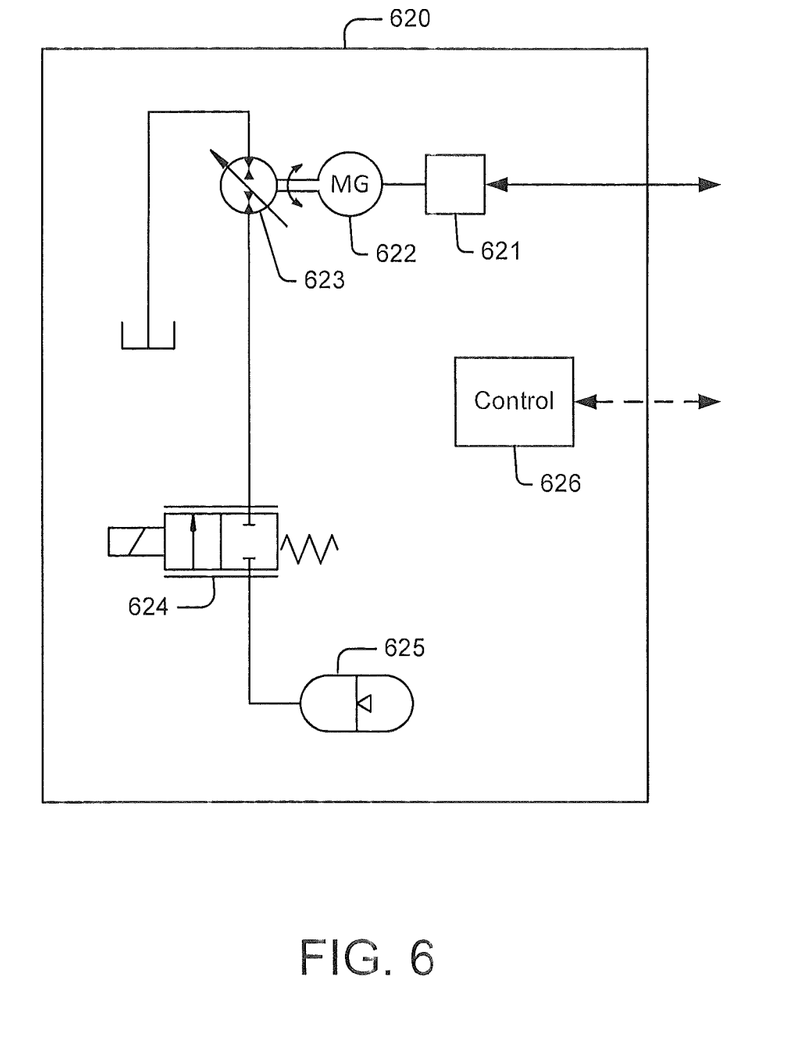
FIG. 6 is a schematic diagram illustrating a reversible electrohydraulic energy storage system according to some embodiments.

According to further embodiments, electrohydraulic energy storage systems may include reversible electrohydraulic systems that can eliminate the need for separate motors, generators and pumps. FIG. 6 illustrates an electrohydraulic energy storage system 620, which may be coupled to a power input of a UPS. The electrohydraulic energy storage system 620 includes a motor/generator 622 configured to be coupled to a power input of a UPS by an interface circuit 621, which may include switches and/or converter circuitry. The motor/generator 622 is mechanically coupled to a hydraulic motor/pump 623. The hydraulic motor/pump 623 is fluidically coupled to a hydraulic accumulator 625 via an electrohydraulic valve 625. Energy stored in the hydraulic accumulator 625 may be used to drive the hydraulic motor/pump 623 as a motor to operate the motor/generator 622 to provide power to the attached UPS. To recharge the accumulator 625, the motor/generator 622 may be operated as a motor to drive the hydraulic motor/pump 623. The electrohydraulic energy storage system 620 further includes a control circuit 626 configured to control the motor/generator 622, valve 625 and/or other components of the electrohydraulic energy storage system 620, and further configured to communicate with other devices, such as the attached UPS. The electrohydraulic energy storage system 620 may be integrated with a UPS in a common assembly with common control circuitry, or may be provided as a separate assembly.

Figure 7:
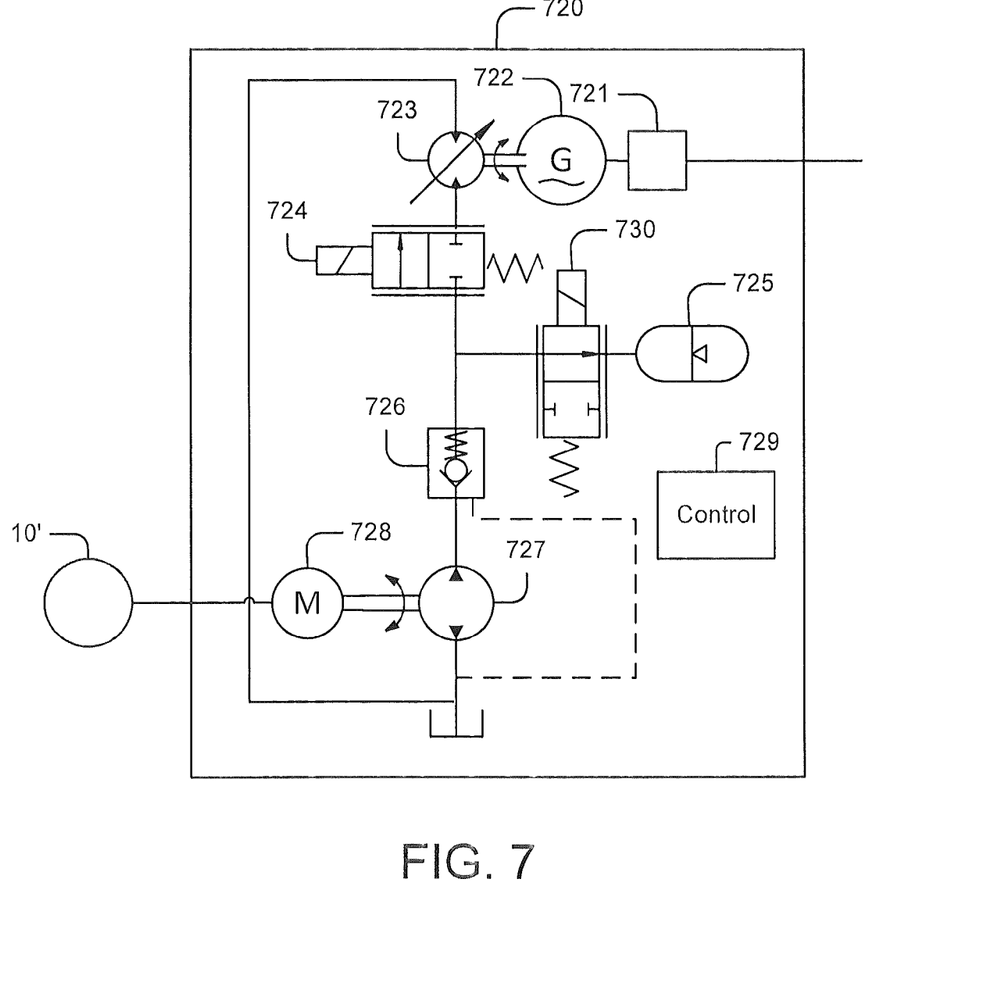
FIG. 7 is a schematic diagram illustrating an electrohydraulic energy transfer system according to some embodiments.

According to still further embodiments, an electrohydraulic generator system may be used as a power converter to, for example, interface power systems. For example, FIG. 7 illustrates an electrohydraulic energy transfer system 920, which includes a generator 722 configured to be coupled to a load (e.g., a UPS and/or other electrical load) via coupling circuitry 721. The generator 722 is configured to driven by a hydraulic motor 723. The hydraulic motor 723 is configured to be driven from a hydraulic accumulator 725 and/or a hydraulic pump 727 via valves 724, 726, 730. An electric motor 728 drives the pump 727. The motor 728 may be driven by a power source 10', which may provide AC and/or DC power. The power source 10' may, for example, have a different frequency (AC or DC) and/or voltage than the frequency and/or voltage of an output produced by the generator 722, and the hydraulic drive train may be used to provide power transfer between the dissimilar electrical domains. The hydraulic accumulator 725 may also be charged by the pump 727, and may be used, for example, to provide backup power in the event of loss of the power source 10' and/or to smooth variations in power from the power source 10' by releasing or absorbing energy. A control circuit 931 may control the interface circuit 721, generator 722, valves 724, 730 and motor 728.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:
1. A power supply system comprising:
an uninterruptible power supply (UPS) comprising an AC input configured to be coupled to an AC power source, an AC output, an inverter and an electrical energy storage device coupled to a DC input of the inverter, the UPS configured to selectively electrically couple the AC output to the AC power source and the electrical energy storage device responsive to a state of the AC power source;
an electrohydraulic energy storage system comprising a hydraulic accumulator, a generator coupled to the UPS, and a hydraulic motor mechanically coupling the generator and the hydraulic accumulator; and a control circuit configured to control the electrohydraulic energy storage system responsive to the state of the AC power source.

2. The power supply system of claim 1, wherein the control circuit is configured to selectively provide power to the load from the energy storage device and the hydraulic accumulator responsive to the state of the AC power source.

3. The power supply system of claim 2, wherein the control circuit is configured to sequentially supply power to the load from the energy storage device and the hydraulic accumulator responsive to a failure of the AC power source.

4. The power supply system of claim 2, wherein the control circuit is configured to concurrently supply power to the load from the energy storage device and the hydraulic accumulator.

5. The power supply system of claim 1, wherein the energy storage device comprises a capacitor.

6. The power supply system of claim 1, wherein the electrohydraulic energy storage system is coupled to the DC input of the inverter.

7. The power supply system of claim 1, wherein the electrohydraulic energy storage system further comprises a reversible motor/pump subsystem configured to be powered by the AC power source and wherein the control circuit is configured to operate the motor/pump subsystem to charge the hydraulic accumulator.

8. The power supply system of claim 1, wherein the generator comprises a reversible motor/generator, wherein the hydraulic pump comprises a reversible motor/pump, and wherein the control circuit is configured operate the motor/generator and the motor/pump to charge the hydraulic accumulator.

9. The system of claim 1, wherein the UPS comprises an on-line UPS.

10. The system of claim 1, wherein the UPS comprises a standby UPS.

11. An apparatus comprising:
a generator configured to be coupled to a power input of an uninterruptible power supply (UPS) comprising an AC input configured to be coupled to an AC power source, an AC output, an inverter and an electrical energy storage device coupled to a DC input of the inverter, the UPS configured to selectively electrically couple the AC output to the AC power source and the electrical energy storage device responsive to a state of the AC power source;
a hydraulic motor configured to drive the generator;
a hydraulic accumulator;
a valve coupling the hydraulic accumulator to the hydraulic motor; and
a control circuit configured to control the valve.

12. The apparatus of claim 11, wherein the control circuit is configured to control the valve responsive to a state of the UPS.

13. The apparatus of claim 11, wherein the control circuit is configured to control the valve responsive to a state of the AC power source.

14. The apparatus of claim 11, further comprising a pump configured to charge the hydraulic accumulator.

15. The apparatus of claim 14, further comprising a motor coupled to the AC power source and configured to drive the pump.

16. The apparatus of claim 11:
wherein the hydraulic motor comprises a motor/pump;
wherein the generator comprises a motor/generator; and
wherein the control circuit is configured to operate the motor/pump as a pump and the motor/generator as a motor to charge the accumulator.

17. The power supply system of claim 11, wherein the generator is configured to be coupled to an AC input of the UPS.

18. The power supply system of claim 11, wherein the generator is configured to be coupled to a DC input of the UPS.

19. A method of operating a UPS comprising an AC input coupled to an AC power source, an AC output, an inverter and an electrical energy storage device coupled to a DC input of the inverter, the UPS configured to selectively electrically couple the AC output to the AC power source and the electrical energy storage device responsive to a state of the AC power source, the method comprising:
providing energy to the load from the AC power source via the UPS; and
providing energy to the load from a hydraulic accumulator via a generator coupled to the UPS.

20. The method of claim 19, wherein providing energy to the load from a hydraulic accumulator via a generator coupled to the UPS comprises selectively providing energy to the load from an energy storage device and the hydraulic accumulator via the UPS responsive to a state of the AC power source.

21. The method of claim 20, wherein selectively providing energy to the load from an energy storage device and a hydraulic accumulator via the UPS responsive to a state of the AC power source comprises providing energy to the load from the energy storage device via an inverter of the UPS.

22. The method of claim 21, wherein selectively providing energy to the load from an energy storage device and a hydraulic accumulator via the UPS responsive to a state of the AC power source comprises providing energy to the load from the hydraulic accumulator via the inverter.

23. The method of claim 20, wherein selectively providing energy to the load from an energy storage device and a hydraulic accumulator via the UPS responsive to a state of the AC power source comprises providing energy to the load from the energy storage device and the hydraulic accumulator responsive to a failure of the AC power source.

* * * * *